(12) United States Patent
Hung et al.

(10) Patent No.: US 8,170,264 B2
(45) Date of Patent: May 1, 2012

(54) ELECTRONIC DEVICE

(75) Inventors: Sheng-Kai Hung, Taipei (TW);
Yan-Shan Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 715 days.

(21) Appl. No.: 12/313,221

(22) Filed: Nov. 17, 2008

(65) Prior Publication Data
US 2010/0054521 A1 Mar. 4, 2010

(30) Foreign Application Priority Data

Sep. 4, 2008 (TW) .................................. 97133967 A (51) Int. Cl.
*H04R 1/02* (2006.01)
(52) U.S. Cl. ...................................................... 381/386
(58) Field of Classification Search .................. 381/386,
381/352, 333, 311, 388, 334, 337, 338, 302,
381/396, 162; 181/199, 153, 155, 150, 152,
181/144, 148, 293, 173; 361/679.23, 679.55;
345/168, 169, 905
See application file for complete search history.

(56) References Cited

U.S. PATENT DOCUMENTS

| | | | |
|---|---|---|---|
| 7,093,688 B2 | 8/2006 | Lee | 181/155 |
| 7,200,000 B1 | 4/2007 | Huang | 361/683 |
| 7,364,009 B2 | 4/2008 | Sperle et al. | 181/150 |

FOREIGN PATENT DOCUMENTS

TW 200830173 7/2008

OTHER PUBLICATIONS http://the-gadgeteer.com/2002/08/16/olympia_soundbug_review/.*
Chinese Examination Report of Taiwan Application No. 097133967, dated Feb. 22, 2011.

* cited by examiner

*Primary Examiner* — Zandra Smith
*Assistant Examiner* — Lawrence Tynes, Jr.
(74) *Attorney, Agent, or Firm* — J.C. Patents (57) ABSTRACT

An electronic device suitable for disposing on a resonating surface is provided. The electronic device has a housing and a resonating speaker. The housing is disposed on the resonating surface. The resonating speaker is assembled onto a bottom of the housing and the resonating speaker contacts the resonating surface.

8 Claims, 8 Drawing Sheets

ELECTRONIC DEVICE

CROSS-REFERENCE TO RELATED APPLICATION

This application claims the priority benefit of Taiwan application serial no. 97133967, filed Sep. 4, 2008. The entirety of the above-mentioned patent application is hereby incorporated by reference herein and made a part of this specification.

BACKGROUND OF THE INVENTION

1. Field of the Invention

The present invention relates to an electronic device and more particularly, to an electronic device with superior sound effects.

2. Description of Related Art

With the advanced and rapid development in audio and video technology today, development of speakers seeking high quality sound effects and efficient space usage plays a vital role in future communication, information, and IA markets.

Speakers also referred to as sound amplifiers have functions to deliver sounds from audio signals. In notebook computer applications, speakers are often used for game playing and CD music playing. However, standard for the sound effects of speakers of notebook computers rises with the increase in users' demand for better audio and video enjoyment.

Figure 1A:
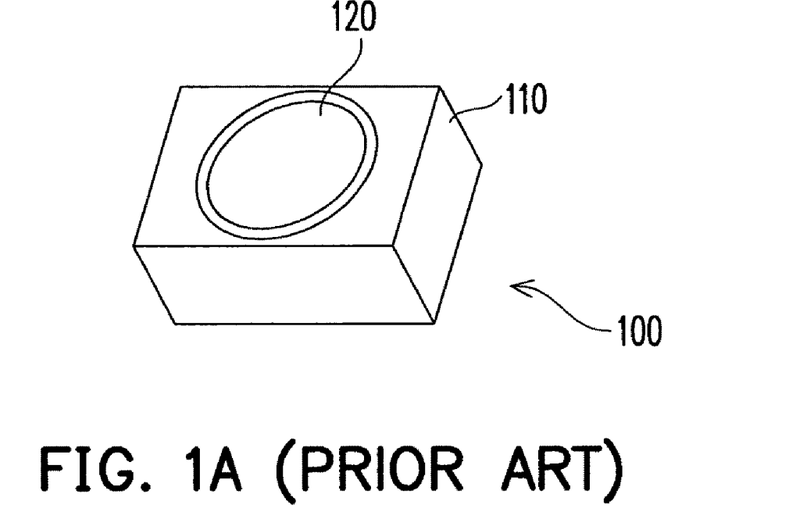
FIG. 1A is a schematic view of a conventional built-in speaker.
Figure 1B:
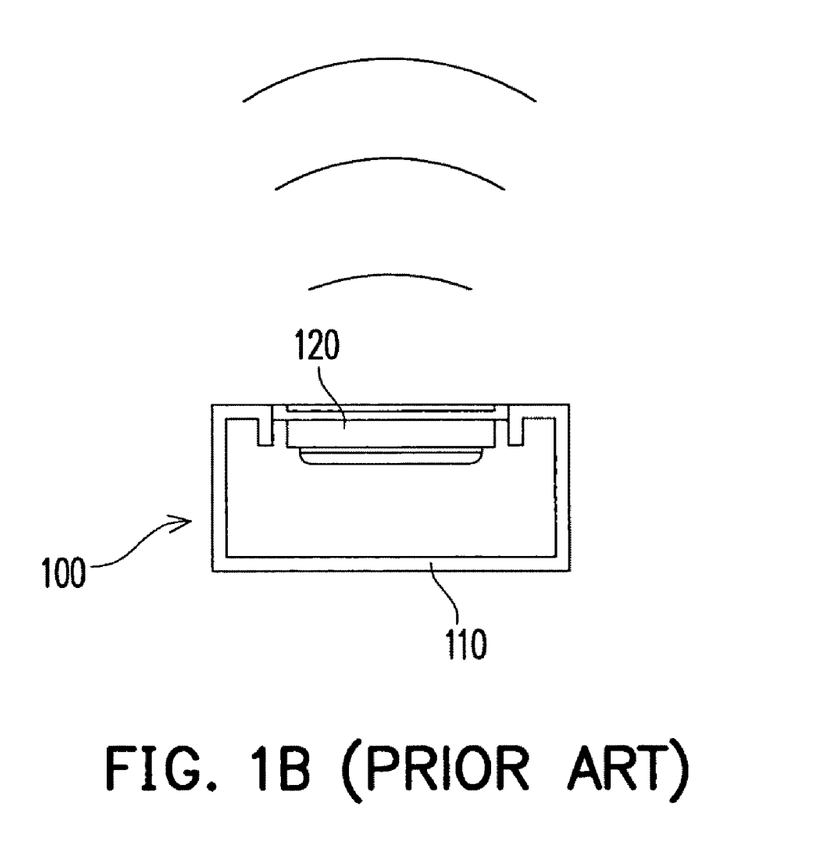
FIG. 1B is a cross-sectional schematic view of the built-in speaker of FIG. 1A.

FIG. 1A is a schematic view of a conventional built-in speaker. FIG. 1B is a cross-sectional schematic view of the built-in speaker in FIG. 1A. Referring to both FIG. 1A and FIG. 1B, a built-in speaker 100 includes a sound box 110 and a resonating film 120. The working theory of the built-in speaker 100 is to use the resonating film 120 and a coil (not shown). Repulsion and attraction between a magnetic field generated by an audio signal passing the coil and permanent magnets fixed next to the coil cause the resonating film 120 to generate audio vibration and output sound.

Figure 1C:
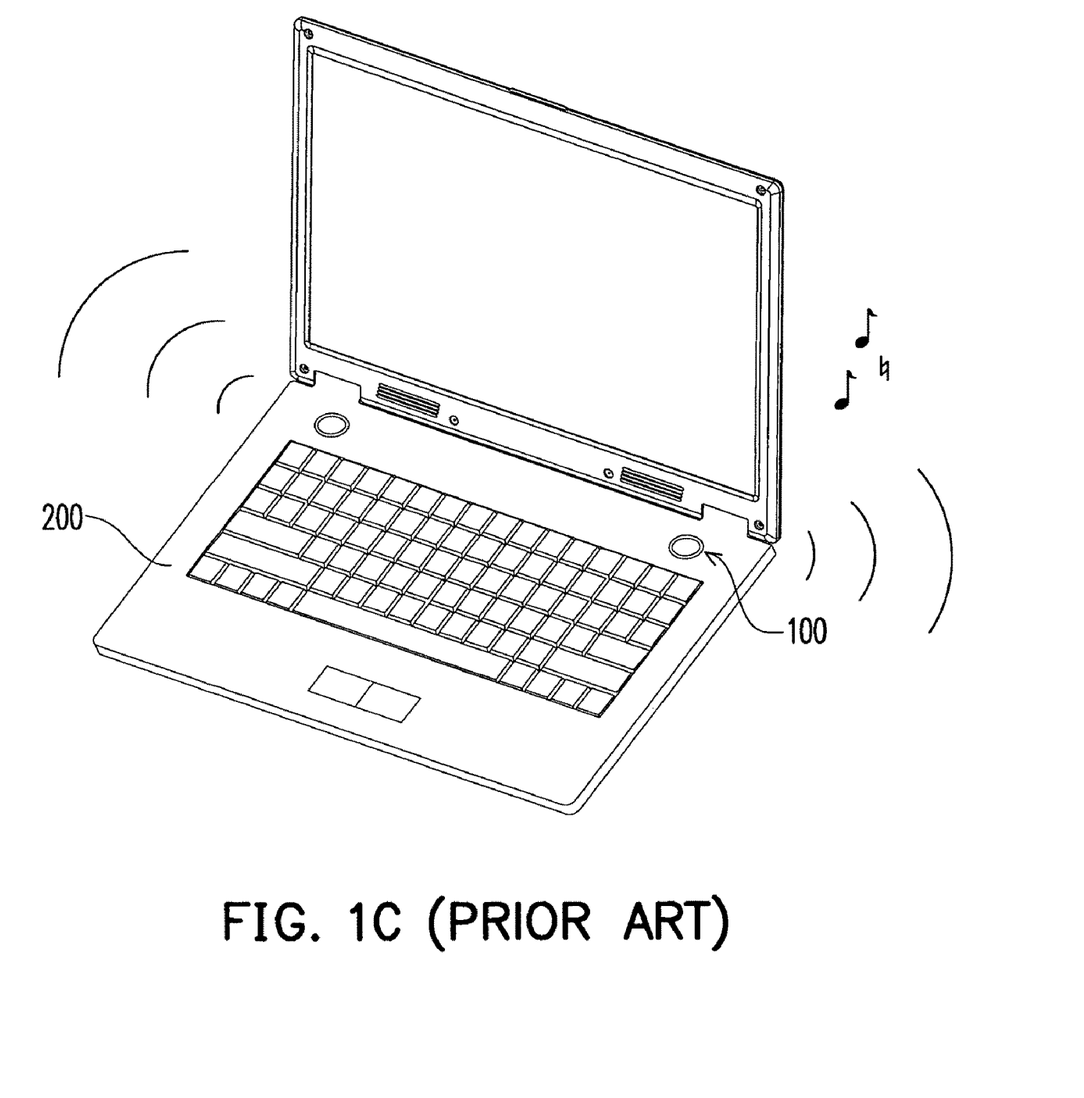
FIG. 1C is a schematic view of a notebook computer which uses the built-in speaker of FIG. 1A.

FIG. 1C is a schematic view of a notebook computer which uses the built-in speaker of FIG. 1A. Referring to FIG. 1A, FIG. 1B, and FIG. 1C at the same time, when the built-in speaker 100 is used in a notebook computer 200, the size of the sound box 110 and resonating area are restricted by the space inside the notebook computer 200. Thus, the sound generating capability of the built-in speaker 100 is limited and the sound heard by a user is weak. As a result, users who demand high quality audio video enjoyment may not purchase the notebook computer 200 because of its poor sound performance.

SUMMARY OF THE INVENTION

The present invention provides an electronic device having deep and wide sound effects.

The present invention provides an electronic device suitable for disposing on a resonating surface. The electronic device includes a first housing and a resonating speaker. The first housing is disposed on the resonating surface. The resonating speaker is assembled onto a bottom of the first housing and the resonating speaker contacts the resonating surface.

In one embodiment of the electronic device of the present invention, the abovementioned resonating speaker includes an audio wave conducting frame and a sound generator. The audio wave conducting frame has a main body and a base connected with the main body. The main body has a containing space. The base contacts the resonating surface. The sound generator is disposed in the containing space of the main body.

In one embodiment of the electronic device of the present invention, the abovementioned first housing has a hole and a base of the resonating speaker protrudes out of the hole. In addition, a bottom of the main body has a curve shape. The resonating speaker further includes a speaker housing assembled onto the bottom of the first housing. The audio wave conducting frame and the sound generator are disposed in the speaker housing. The speaker housing has a hole and the base protrudes out of the hole to contact the resonating surface.

In one embodiment of the electronic device of the present invention, the electronic device further includes a plurality of fixing members which lock into the first housing through the resonating speaker so as to secure the resonating speaker with the first housing. Each fixing member includes a nut and a screw, wherein the nut connects the resonating speaker and the first housing and the screw locks into the nut through the resonating speaker.

In one embodiment of the electronic device of the present invention, the abovementioned first housing has a display screen disposed on a top of the first housing.

In one embodiment of the electronic device of the present invention, the electronic device further includes a second housing hinged to the first housing. The second housing has a display screen and the first housing has a keyboard disposed on a surface of the first housing facing the second housing.

In the electronic device of the present invention, the resonating speaker is assembled onto the bottom of the housing of the electronic device and the desktop on which the electronic device is placed is used as a resonating surface so as to achieve deep and wide sound effects.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 2A:
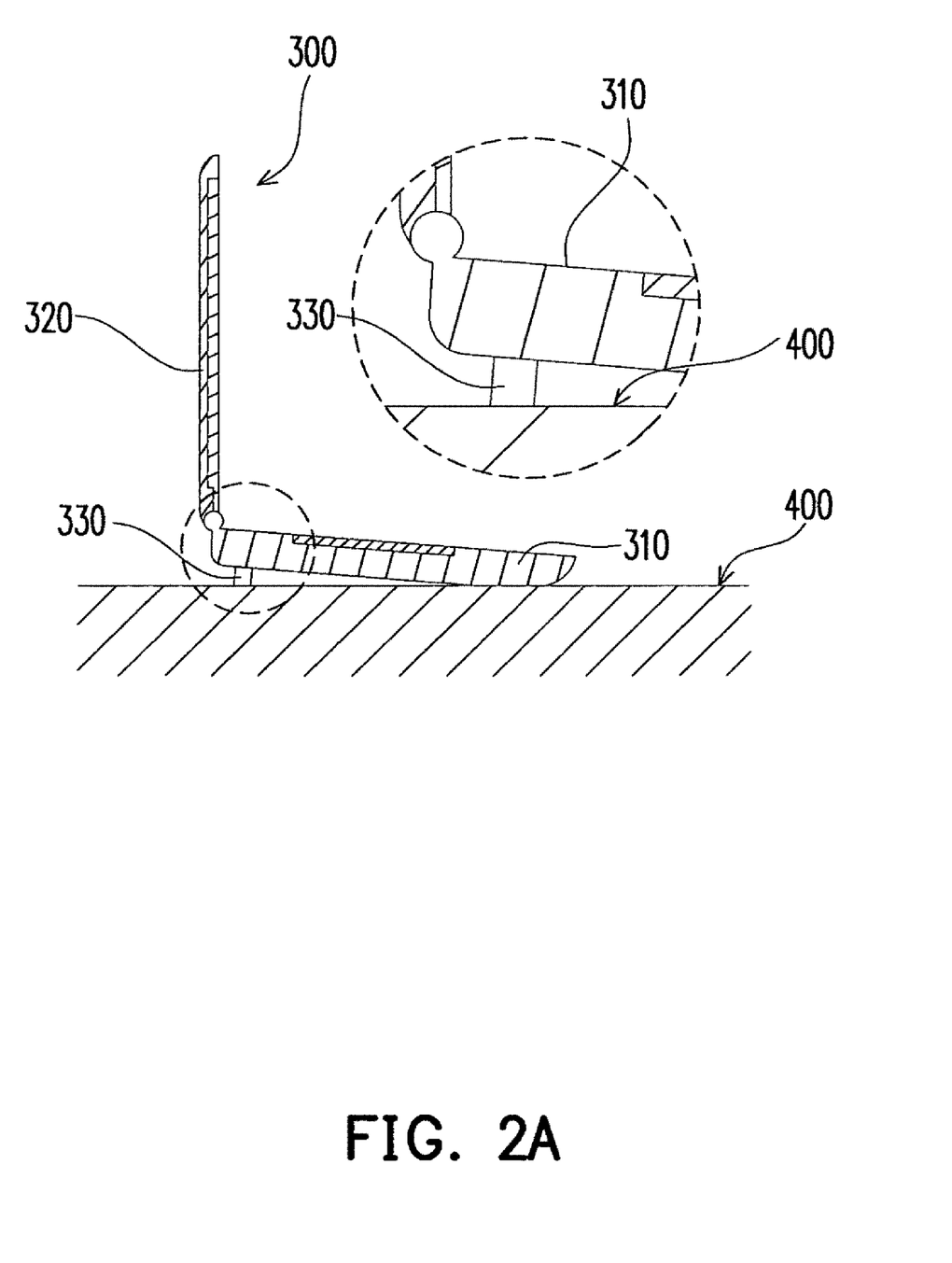
FIG. 2A is a schematic view of the electronic device of the first embodiment of the present invention.

FIG. 2A is a schematic view of the electronic device of the first embodiment of the present invention. Referring to FIG. 2A, an electronic device 300 is suitable for disposing on a resonating surface 400. The electronic device 300 in the present embodiment is a notebook computer and the resonating surface 400 is, for example, a glass table surface, a wooden table surface, a metal table surface, a bookshelf, a wine cabinet or any other hard surface. The electronic device 300 includes a first housing 310, a second housing 320, and a resonating speaker 330. The second housing 320 is hinged to the first housing 310 which is disposed on the resonating surface 400. The resonating speaker 330 is assembled onto a bottom of the first housing 310 and the resonating speaker 330 contacts the resonating surface 400. Through the contact between the resonating speaker 330 of the electronic device 300 and the resonating surface 400, the weight of the electronic device 300 enables a good contact between the resonating speaker 330 and the resonating surface 400 and thus deep and wide sound effects can be generated by resonance.

Although the present embodiment uses a notebook computer as an example, persons of ordinary skill in the art may make modifications to the embodiments of the electronic device of the present invention without departing from the spirit of the present invention. For example, the resonating speaker may be used in a single housing tablet computer.

Figure 2B:
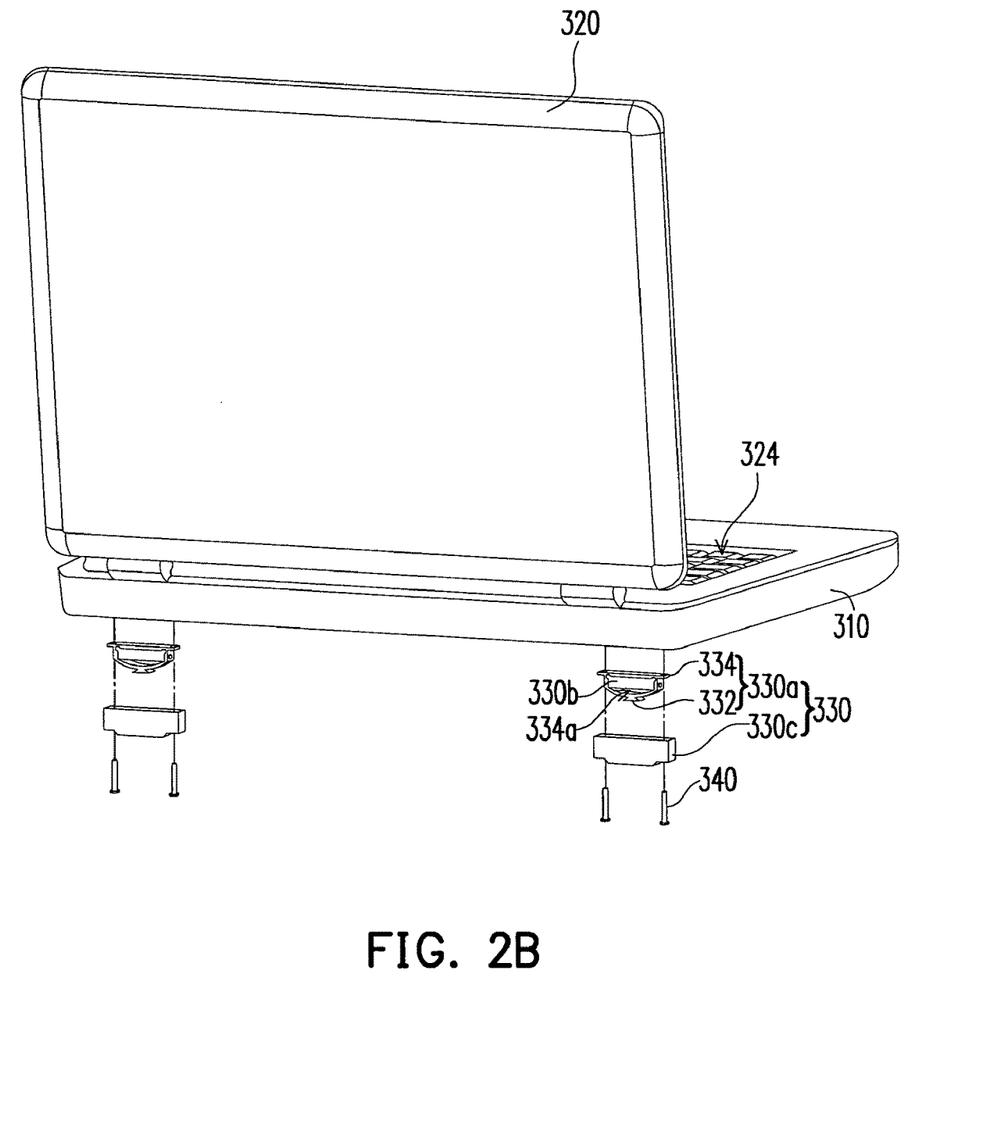
FIG. 2B is a schematic view of the electronic device with elements of the electronic device being exploded of the present invention of FIG. 2A.
Figure 2C:
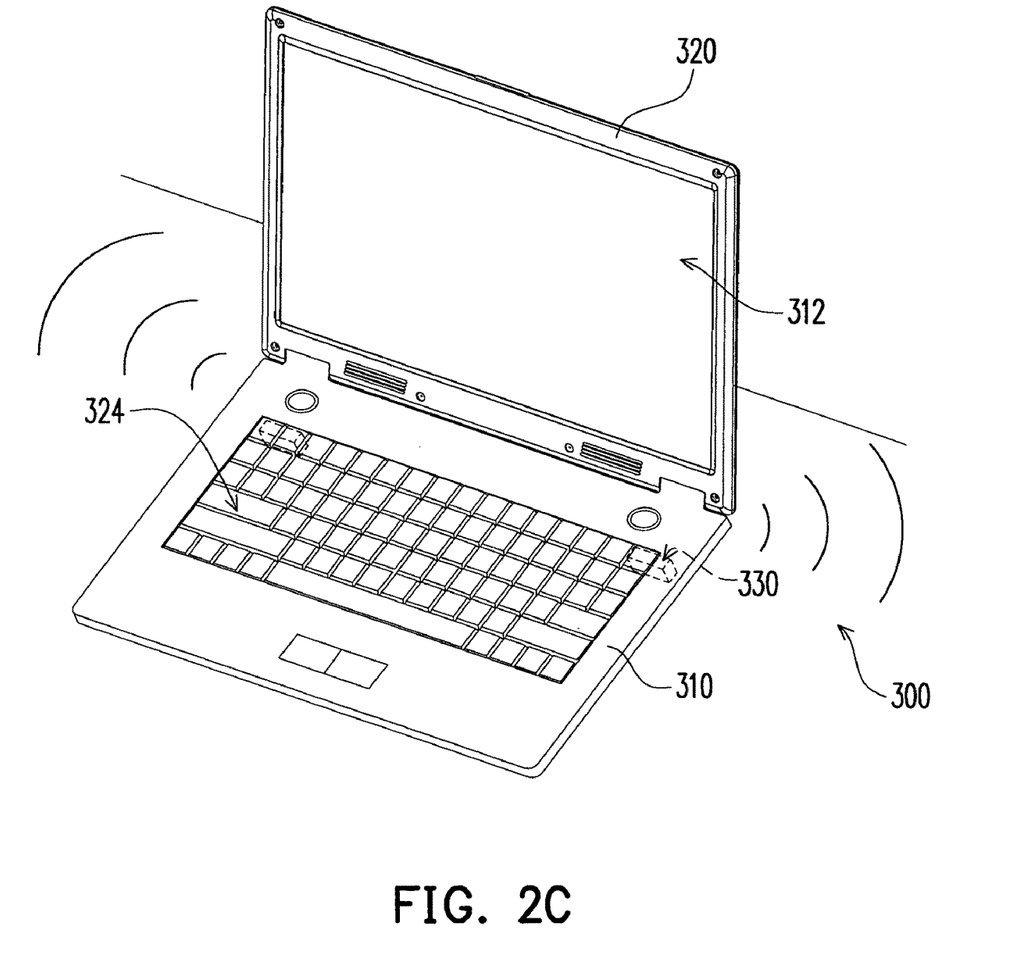
FIG. 2C is a schematic view of the electronic device of FIG. 2B from another perspective.
Figure 2D:
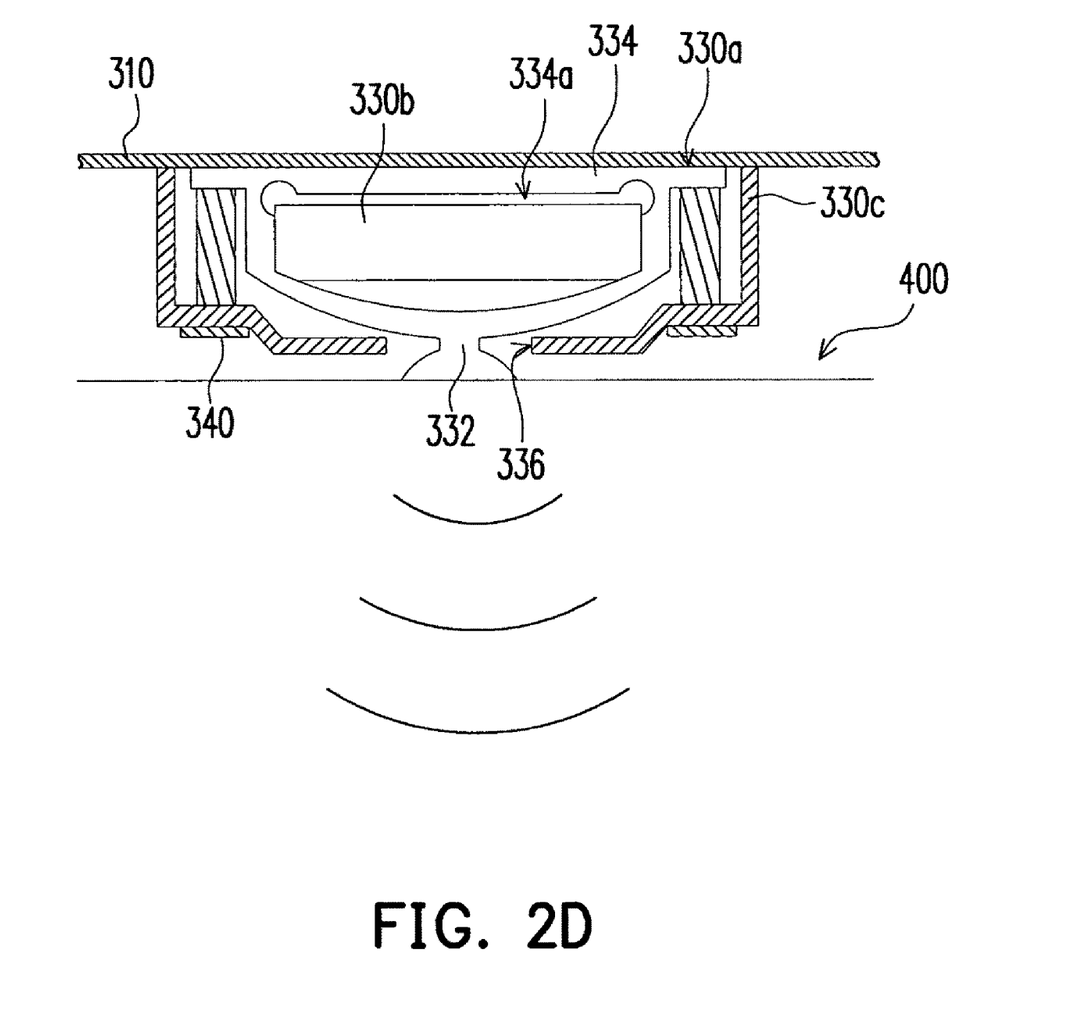
FIG. 2D is a partial cross-sectional view of the electronic device of FIG. 2A.

FIG. 2B is a schematic view of the electronic device with elements of the electronic device being exploded of the present invention of FIG. 2A. FIG. 2C is a schematic view of the electronic device of FIG. 2B from another perspective. FIG. 2D is a partial cross-sectional view of the electronic device of FIG. 2A. Referring to FIG. 2B, FIG. 2C, and FIG. 2D at the same time, the first housing 310 has a keyboard 324 disposed on a surface of the first housing 310 facing the second housing 320. The second housing 320 has a display screen 312 disposed on a surface of the second housing 320 facing the first housing 310. In other words, when the electronic device 300 is closed, the display screen 312 and the keyboard 324 face each other.

The resonating speaker 330 includes an audio wave conducting frame 330a and a sound generator 330b. The audio wave conducting frame 330a has a base 332 and a main body 334 connected to the base 332. The main body 334 has a containing space 334a in which the sound generator 330b is disposed. The base 332 contacts the resonating surface 400. In the present embodiment, a bottom of the main body 334 has a curve shape.

In addition, the resonating speaker 330 further includes a speaker housing 330c assembled onto a bottom of the first housing 310. The audio wave conducting frame 330a and the sound generator 330b are both disposed in the speaker housing 330c. The speaker housing 330c has a hole 336 out of which the base 332 of the audio wave conducting frame 330a protrudes to contact the resonating surface 400.

In addition, the electronic device 300 further includes a plurality of fixing members 340 which pass through the speaker housing 300c of the resonating speaker 330 and lock into the first housing 310 so that the resonating speaker 330 and the first housing 310 are secured together. The fixing members 340 in the present embodiment are screws. Specifically, the screws pass through the speaker housing 330c and the audio wave conducting frame 330a and then lock into the first housing 310.

In other embodiments that are not illustrated in the figures, the fixing members 340 may be a combination of screws and nuts, wherein the nuts connect the resonating speaker 330 and the first housing 310 and the screws lock into the nuts through the resonating speaker 330. The assembly of the resonating speaker 330 and the first housing 310 can be firmly secured and the stability of the electronic device 300 during use can be increased by using the combination of screws and nuts.

When a user uses the electronic device 300 to listen to music, watch television programs, or watch films, the sound generator 330b of the resonating speaker 330 will generate sound and vibration of the sound frequency will pound on the audio wave conducting frame 330a which conducts the audio wave. The base 332 of the audio wave conducting frame 330a contacts the resonating surface 400. The audio wave is sent to the resonating surface 400 with the vibration of the audio wave conducting frame 330a so that sound is generated through the weight of the electronic device 300. Sounds may pass through the top and bottom surfaces of a table and audio waves are sent out from various angles of the resonating surface 400 by resonance. Therefore, the user may hear sounds of equal volume as well as even, clear, and full sound quality whether from the front, back, left or right of the electronic device 300. This way, the user is able to enjoy 360 degree surround sound.

It should be mentioned that because the resonating speaker 330 creates a sound field effect by sending audio waves to the resonating surface 400, the weight of the electronic device 300 affects whether the base 332 of the audio wave conducting frame 330a firmly contacts the resonating surface 400 and thus further affects the audio/video enjoyment the electronic device 300 provides to the user. Therefore, the larger the overall weight of the electronic device 300 is and the smaller the contacting surface of the base 332 with the resonating surface 400 is, the better the conducting effect of audio waves from the audio wave conducting frame 330a to the resonating surface 400 is and the better the audio/video enjoyment the user feels.

Figure 3A:
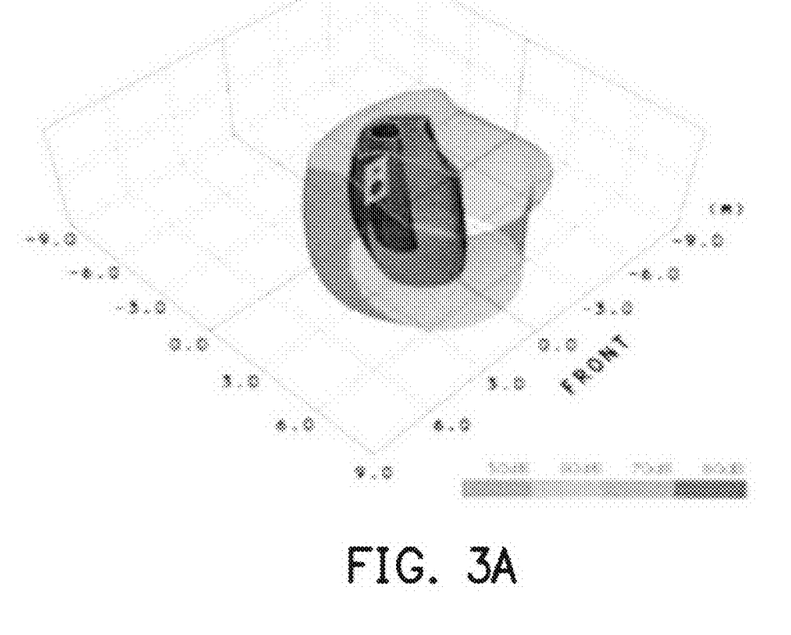
FIG. 3A is a sound field analysis of a conventional electronic device.
Figure 3B:
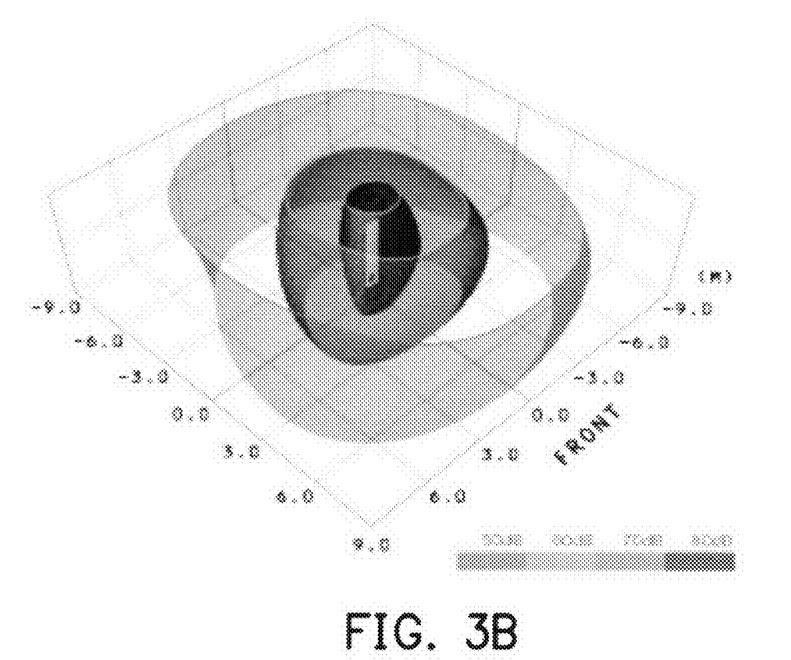
FIG. 3B is a sound field analysis of the electronic device of the first embodiment of the present invention.

FIG. 3A is a sound field analysis of a conventional electronic device. FIG. 3B is a sound field analysis of the electronic device of the present embodiment. Referring to FIGS. 3A and 3B, the electronic device of the present embodiment has a deeper and wider sound effect than that of a conventional electronic device.

In addition, audio signals are transformed as mechanical vibrations for output. Therefore, as long as there is a hard surface, it may be used as a sound conducting medium, which is a convenience for the user. In addition, the user has different audio/video enjoyment for a same song, program, or film on different sound conducting media. Alternatively, the resonating surface 400 may selectively be of different materials based on the type of music to satisfy the user's demand for sound quality. For example, glass is a brittle conducting material and therefore has an ideal sound performance for high frequency and high pitch sounds such as rock and roll, electric and dance music when the electronic device 300 is placed on the resonating surface 400 of glass material. The resonating surface 400 of wooden material has ideal sound performance for low frequency and low pitch sounds such as slow romantic songs. Basically, sound performance of log wood is better than that of compressed wood. Furthermore, when the electronic device 300 is placed on a metal cabinet, the sound generated is similar to a drum being played so it is ideal for listening to rock and roll music. When the electronic device 300 is placed in a wine cabinet, the effects of resonance and consonance are multiplied due to the resonating space in the wine cabinet and this is worth trying. Alternatively, a wooden table covered with glass on top has good performance for both high pitch and low pitch sounds. It should be mentioned that if the electronic device 300 is placed on an artificial rock table, the sound quality has not only the loudness and clearness from a glass table but also the deepness from a wooden table and this can definitely fulfill the user's high demand for sound quality.

In light of the above, deep and wide sound effects may be achieved and the user's demand may be satisfied through the contact between the resonating speaker 330 and the resonating surface 400. Furthermore, the user may choose sound conducting media of different materials based on different types of music to satisfy his audio/video enjoyment. Therefore, the electronic device 300 of the present invention provides usage convenience.

Second Embodiment

The present embodiment is generally the same as the first embodiment with a difference in the assembly positions of the resonating speaker and the second housing.

Figure 4:
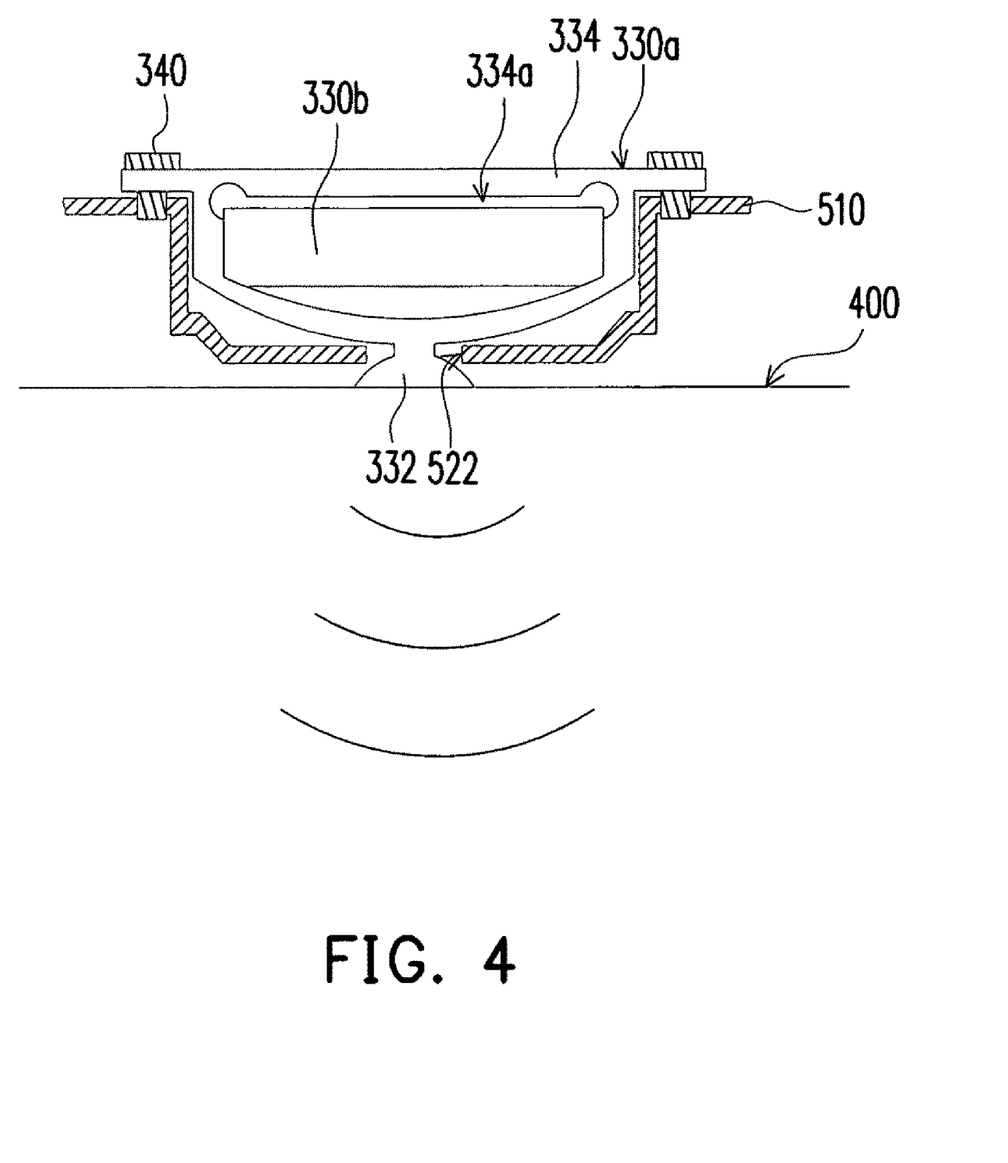
FIG. 4 is a schematic view of the resonating speaker and the second housing of the second embodiment of the present invention.

FIG. 4 is a schematic view of the resonating speaker and the second housing of the second embodiment of the present invention. Referring to FIG. 3, a resonating speaker 330 is disposed in a second housing 510 and the resonating speaker 330 has no speaker housing. The second housing 510 has a hole 522 and a base 332 of the resonating speaker 330 protrudes out of the hole 522 to contact a resonating surface 400. A fixing member 340 passes through an audio wave conducting frame 330a of the resonating speaker 330 and locks into the second housing 510.

From the above two embodiments, persons of ordinary skill in the art may make modifications to the assembly of the resonating speaker and the second housing as well as the place of disposition of the resonating speaker in the electronic device, which are not limited by the present invention herein.

In summary, the electronic device of the present invention has deeper and wider sound effects than conventional technology. In addition, the sound quality the user hears is even, clear, and full. For a user of the electronic device of the present invention, he may enjoy 360 degree surround sound effect. Furthermore, the user may place the electronic device on a resonating surface of different materials based the types of music for better audio/video enjoyment. Alternatively, when playing same music, the user may place the electronic device on resonating surfaces of different materials for various sound effects and extraordinary audio/video enjoyment and pleasure.

It will be apparent to those of ordinary skills in the technical field that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An electronic device, suitable for disposing on a resonating surface, the electronic device comprising:
   a first housing, suitable for disposing on the resonating surface;
   a second housing, being hinged to the first housing, wherein the second housing has a display screen; and
   a resonating speaker, assembled onto a bottom of the first housing and contacting the resonating surface.

2. The electronic device according to claim 1, wherein the resonating speaker comprises:
   an audio wave conducting frame, comprising a main body and a base connected to the main body, wherein the main body has a containing space and the base contacts the resonating surface; and
   a sound generator, disposed in the containing space of the main body.

3. The electronic device according to claim 2, wherein the first housing has a hole and the base of the resonating speaker protrudes out of the hole.

4. The electronic device according to claim 2, wherein a bottom of the main body has a curve shape.

5. The electronic device according to claim 2, wherein the resonating speaker further includes a speaker housing assembled onto the bottom of the first housing, the audio wave conducting frame and the sound generator are disposed in the speaker housing, the speaker housing has a hole, and the base protrudes out of the hole to contact the resonating surface.

6. The electronic device according to claim 1, further comprising a plurality of fixing members, wherein the fixing members pass through the resonating speaker and lock into the first housing so as to secure the resonating speaker with the first housing.

7. The electronic apparatus of claim 6, wherein each of the fixing members comprises:
   a nut, connecting the resonating speaker and the first housing; and
   a screw, passing through the resonating speaker and locking into the nut.

8. The electronic device according to claim 1, wherein the first housing has a keyboard disposed on a surface of the first housing facing the second housing.

* * * * *